(12) United States Patent
Chitty et al.

(10) Patent No.: US 6,827,580 B1
(45) Date of Patent: Dec. 7, 2004

(54) FIBERSCOPE TRAINING APPARATUS

(75) Inventors: Christopher Hargrave Chitty, Wellington (NZ); Bernard Joseph Guy, Wellington (NZ); Colin Peter Marsland, Wellington (NZ)

(73) Assignee: Replicant Limited, Wellington (NZ)

( * ) Notice: Subject to any disclaimer, the term of this patent is extended or adjusted under 35 U.S.C. 154(b) by 0 days.

(21) Appl. No.: 10/031,675

(22) PCT Filed: Jul. 24, 2000

(86) PCT No.: PCT/NZ00/00136
§ 371 (c)(1),
(2), (4) Date: Jun. 19, 2002

(87) PCT Pub. No.: WO01/08126
PCT Pub. Date: Feb. 1, 2001

(30) Foreign Application Priority Data

Jul. 23, 1999 (NZ) ................................. 336904
Jun. 1, 2000 (NZ) ................................. 504890

(51) Int. Cl.[7] .............................................. G09B 23/28
(52) U.S. Cl. ........................ 434/267; 434/262; 434/272
(58) Field of Search ................................ 446/116, 120, 446/124, 126, 127; 434/267, 270, 272

(56) References Cited

U.S. PATENT DOCUMENTS

| 1,600,599 | A | * | 9/1926 | Parker | 434/272 |
| 3,376,659 | A | * | 4/1968 | Asin et al. | 434/272 |
| 4,332,569 | A | * | 6/1982 | Burbank | 434/272 |
| 4,459,113 | A | * | 7/1984 | Boscaro Gatti et al. | 434/272 |
| 4,726,772 | A | * | 2/1988 | Amplatz | 434/272 |
| 5,597,310 | A | * | 1/1997 | Edde | 434/272 |
| 5,823,787 | A | * | 10/1998 | Gonzalez et al. | 434/265 |
| 5,846,087 | A | * | 12/1998 | Scherer | 434/270 |
| 6,234,804 | B1 | * | 5/2001 | Yong | 434/267 |

FOREIGN PATENT DOCUMENTS

| DE | 4225519 | 2/1994 |
| WO | WO 9321619 | 10/1993 |
| WO | WO 9938141 | 7/1999 |
| WO | WO 9942977 | 8/1999 |

OTHER PUBLICATIONS

C.R. Bainton, "Models to Facilitate the Learning of Fiberoptic Technique", International Anesthesiology Clinics, vol. 32, No. 4, 1994.

* cited by examiner

Primary Examiner—Derris H. Banks
Assistant Examiner—Dmitry Suhol
(74) Attorney, Agent, or Firm—Dann, Dorfman, Herrell and Skillman, P.C.

(57) ABSTRACT

A fiberscope training apparatus comprises mouth and/or nose aperture(s) leading to a network of multiple pathways through which a fiberscope may be manipulated. The pathways are formed by connection together of a number of individual branch components which are individually typically of a general Y-configuration. They may be connected together sequentially to form an expanding number of pathways in two or three dimensions. Further components may represent internal organs.

22 Claims, 5 Drawing Sheets

FIBERSCOPE TRAINING APPARATUS

FIELD OF INVENTION

The invention comprises a fibrescope training apparatus or mannequin for use in training physicians in the use of fibrescope for laproscopy for example, or improving or maintaining physician's, skills and dexterity in the use of fibrescopes.

BACKGROUND OF INVENTION

A fibrescope comprises a length of optical fibre with a small "eye" lens at one end which is passed through the oral or nasal cavity and into a patient, and a larger viewing lens at the other end (or alternatively the fibrescope may be connected to a system for displaying the image on a VDU or similar). Insertion of a fibrescope requires that the eye end of the fibrescope is passed through the oral or nasal cavity and that as the fibrescope is slowly inserted further into the patient it is manipulated/twisted to thereby move and appropriately position the eye end of the fibrescope. Physicians require training in the use and manipulation of fibrescopes. Physicians who use fibrescopes regularly may maintain ongoing dexterity but physicians who use fibrescopes less frequently may require practice from time to time to maintain their dexterity in the use of a fibrescope.

SUMMARY OF INVENTION

The invention provides an improved or at least alternative form of fibrescope training apparatus or mannequin.

In broad terms the invention comprises a fibrescope training apparatus comprising mouth and/or nose apertures leading to a network of multiple pathways through which the fibrescope may be manipulated, the pathways formed by connection together of number of individual hollow branch components.

Preferably at least some or all of the branch components are of a Y-configuration comprising an entry end and two or more exit ends, which may be connected together sequentially to form an expanding number of pathways in two or three dimensions.

Preferably the fibrescope training apparatus further includes a component representing an internal organ, connectable to a branch component and comprising an entry passage that expands into an internal cavity. The internal cavity of the organ component may also reduce to an exit passage from the internal cavity.

Preferably the apparatus according further comprises one or more cap components connectable to an exit end of a branch component. The cap(s) may comprise a symbol, object, or image on the underside of the cap which faces into the branch component when the cap is connected to the exit end of the branch component.

One or more of the branch components may also comprise an aperture through a side of the component into the interior of the component between the entry end and the exit end, and one or more caps including a part adapted to fit in said aperture and an end comprising a symbol, object, or image which will face into the interior of the branch component when the cap is in place.

Preferably the fibrescope training apparatus comprises an oral and nasal cavity component including mouth and nose apertures which lead to oral and nasal cavities, which lead to and join at an exit end from the oral and nasal cavity component.

BRIEF DESCRIPTION OF THE DRAWINGS

The invention will be further described with reference to the accompanying drawings by way of example and without intending to be limiting, which show preferred forms of fibrescope training mannequins of the invention. In the drawings.

DETAILED DESCRIPTION OF PREFERRED FORM

Figure 1:
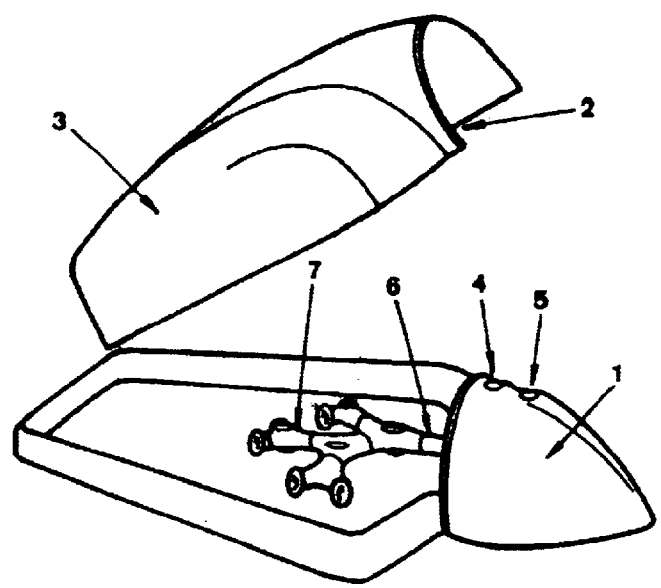
FIG. 1 is a perspective view of a first preferred form fibrescope training mannequin open.

The preferred form fibrescope training mannequin shown in FIG. 1 comprises a "body" comprising a head section 1 and chest section 2, which includes a chest lid 3. Apertures 4 and 5 in the head section 1 represent oral and nasal apertures in a patient, and lead to tube 6 extending into the mannequin from the head sectional 1 as shown.

A branch network 7 within the mannequin body is made up of a number of individual branch components connected together to form an expanding number of pathways from the tube 6, through which a user may practice in manipulating a fibrescope in training with the mannequin.

Figure 2:
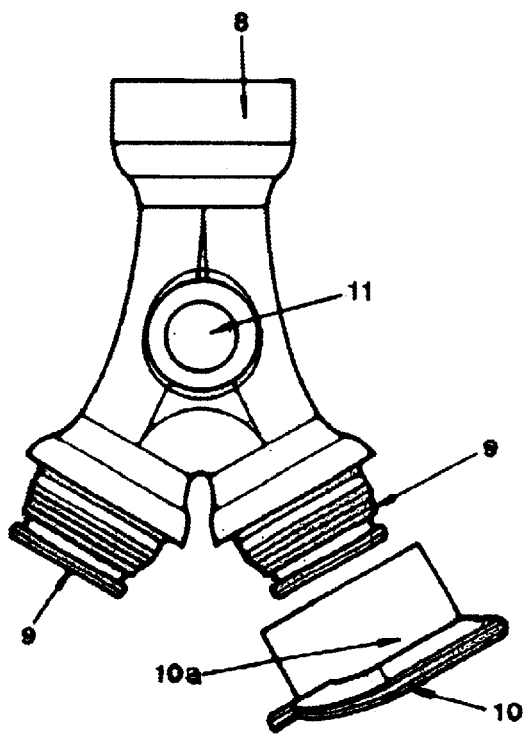
FIG. 2 shows a single branch component of the mannequin of FIG. 1 and a cap component.

FIG. 2 shows a single branch component of the mannequin of FIG. 1 which is of a general Y-configuration having a hollow interior and comprising an entry end 8 and exit ends 9. In making up a network of branch components, a first component is connected or plugged onto the tube 6 from the head section of the mannequin by pushing the entry end 8 of the first component over the tube 6, and then other similar branch components may be connected to each of the exit ends 9 of the first branch component, and again, to form a network of branch components providing an expanding number of pathways. The exit ends of the final branch components in the network may be closed by caps 10 as shown in FIG. 2. Typically the branch components and caps will be formed from plastic by injection moulding. As shown in FIGS. 1 and 2 the branch components are a Y-configuration comprising one entry end 8 leading to two exit ends 9 but it is possible that the branch components could be in other configurations such as comprising a single entry end leading to three exit ends or two or more entry ends etc.

Figure 3:
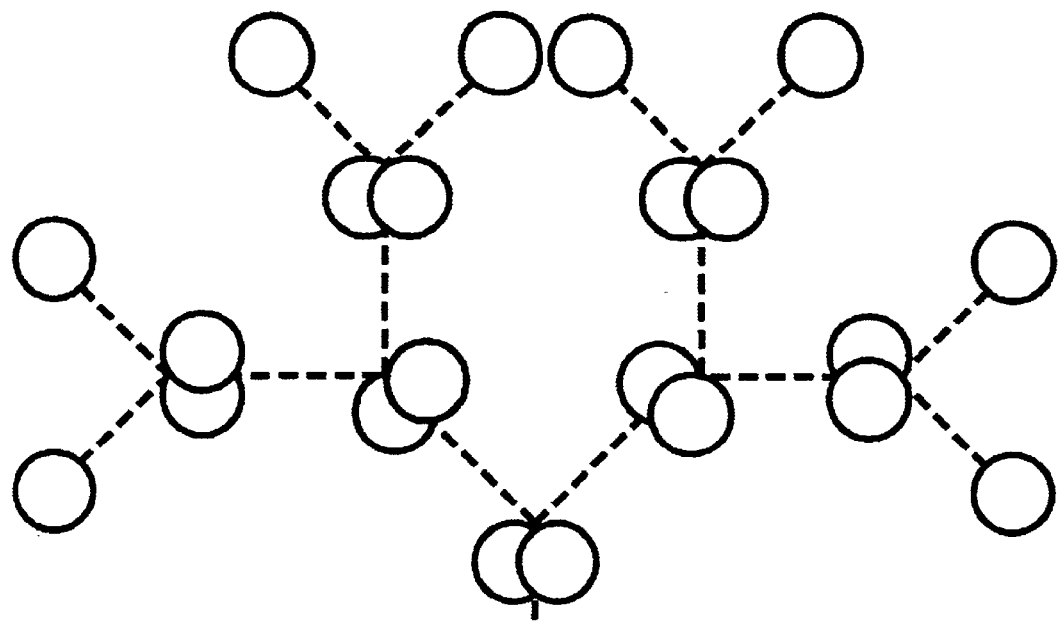
FIG. 3 is a pathway "map" as will be referred to further.

The branch components connected together to form the branch network 7 provide an expanding number of pathways in two dimensions, for training in simple "left or right" manipulation of a fibrescope, or three dimensions for training in more complex manipulations of a fiberscope. FIG. 3 shows a "map" of the pathways which may be used in training persons. A person may have the objective of manipulating the fibrescope through the mannequin to place the eye of the fibrescope at a predetermined point on the pathway "map" for example.

A predetermined symbol, object or image or a range of symbols, objects or images may be provided on the end 10a of the cap component which can be viewed through the fibrescope in use. Optionally the branch components may comprise additional apertures such as at 11 in FIG. 2 to which cap components and components of various shapes may be fitted also carrying on the ends a predetermined symbol, object or image. A person training on the mannequin may have the objective of locating a particular object or image which can be viewed through the fibrescope, and manipulates the fibrescope to locate the correct object or image or one and then another object or image. The person may be able to view the object or image on a separate paper sheet or similar as well as through the fibrescope, to assist the person in becoming accustomed to the size of what is seen through the fibrescope relative to the actual size. The object or image may be incorporated into games.

FIGS. 4 to 9 show another prefaced form of fibrescope training mannequin of the invention. These figures do not show a separate "body" as in FIG. 1 but simply components which may be used to form an expanding number of pathways similar to the branch network 7 of FIG. 1. The components of FIGS. 4 to 9 when assembled together to form a branch network may be housed within a "body" enclosure such as that of FIG. 1 or similar or of any other suitable shape or form to simulate a patient, or alternatively may be used for fibrescope training without a separate "body" enclosure in which case the branch components themselves when assembled together form the training mannequin.

Figure 8:
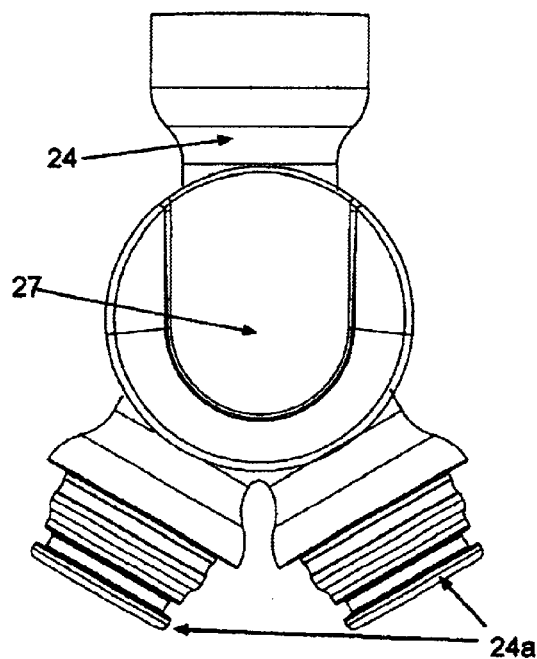
FIG. 8 shows a Y-branch component of the mannequin of FIGS. 4 to 7.
Figure 4:
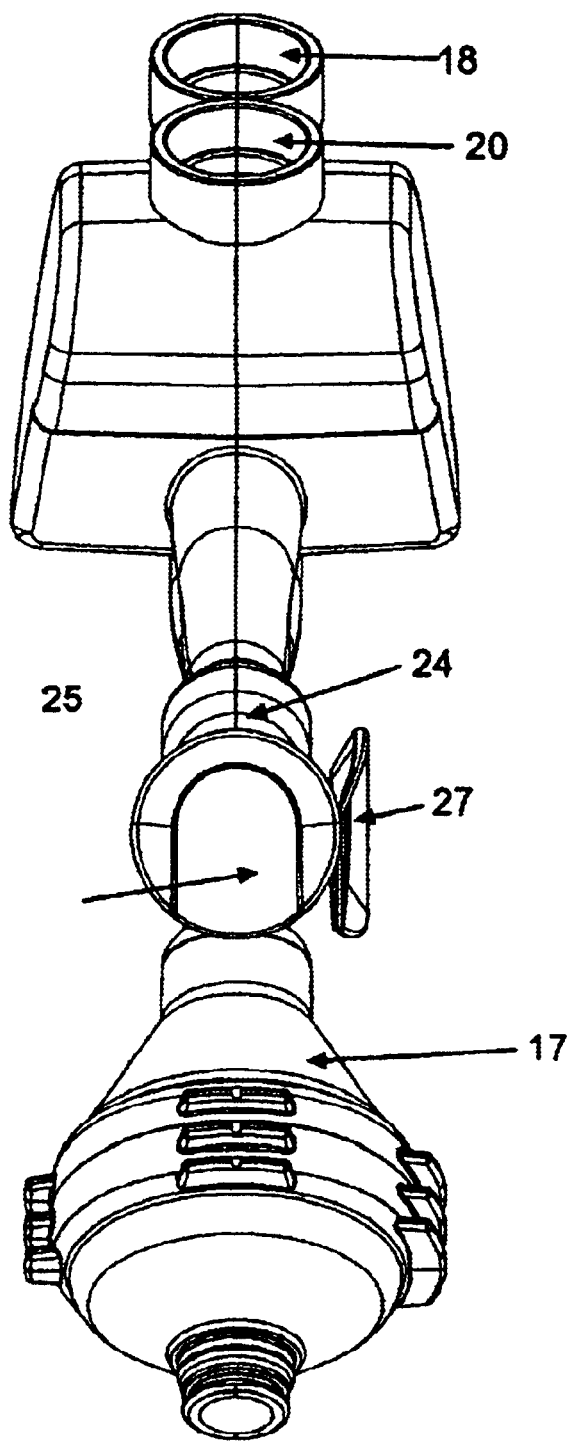
FIG. 4 is a view from one end of a number of components connected together to form a simple branch network, of another preferred form of mannequin.
Figure 5:
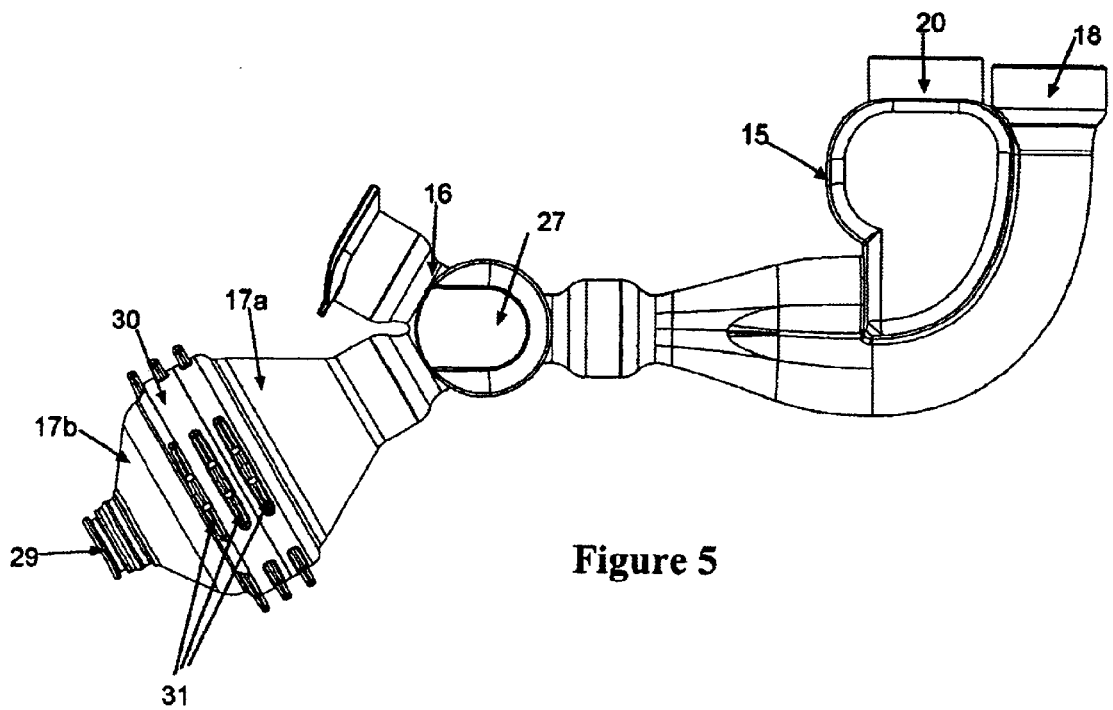
FIG. 5 is a side view of the mannequin of FIG. 4.
Figure 6:
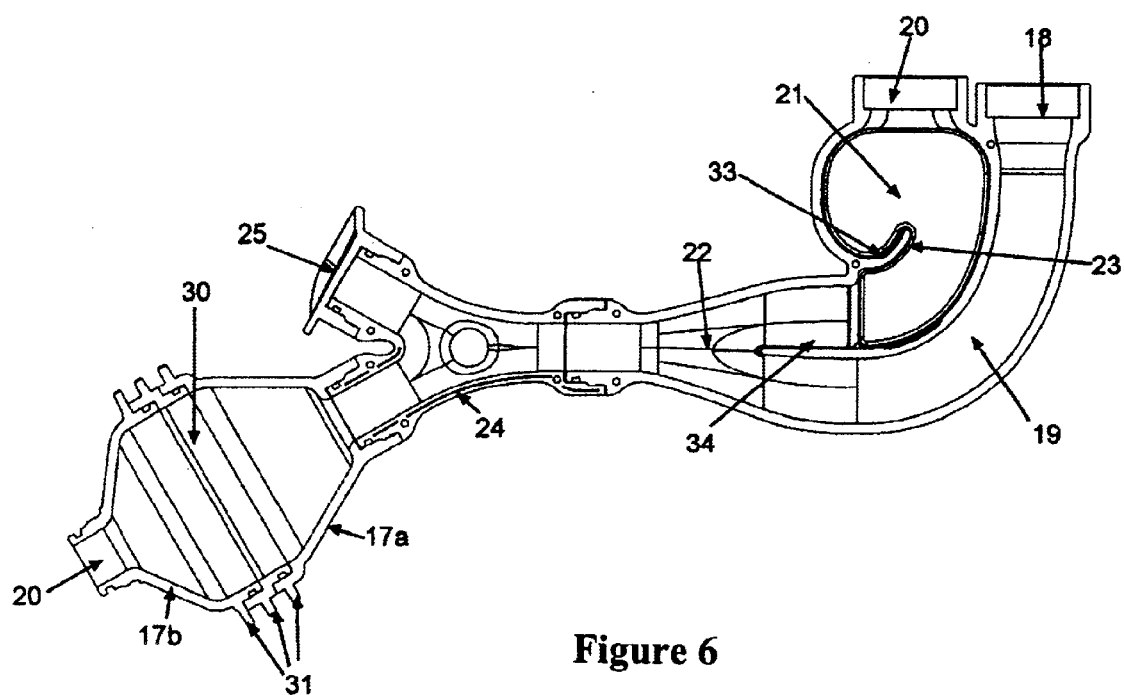
FIG. 6 is a longitudinal cross-section of the mannequin of FIG. 4.

Referring to FIGS. 4 to 6, this form of mannequin comprises an oral and nasal cavity component 15, a number of Y-branch components 16 (only one of which is shown) which is similar to the branch component of FIG. 2 and which is separately shown in FIG. 8, and one or more components 17. In component 15 aperture 18 leading to passage 19 represents the nasal passage of a patient, and aperture 20 leading to cavity 21 represents the mouth and oral cavity of the patient. The passage from the back of the oral cavity 21 joins nasal passage 19 at 22 in the throat region of the mannequin. Protruding web 23 within the oral cavity 21 simulates the patients tongue.

Figure 7:
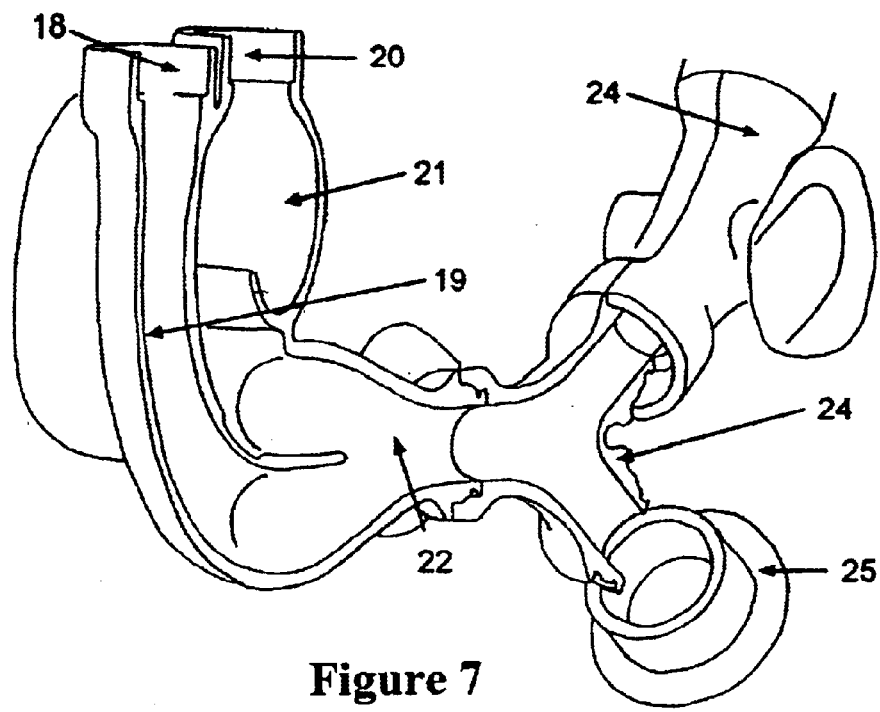
FIG. 7 is a cut away perspective view of part of the mannequin of FIGS. 4 to 6.

As in the mannequin of FIGS. 1 and 2, Y-branch components such as that indicated at 24 in FIGS. 4 to 6 are connected to the oral and nasal cavity component 15 to form a branch network providing an expanding number of pathways through which a user may practice in manipulating a fibrescope in training with the mannequin. FIG. 7 is a cut away view through the oral and nasal cavity component 15 and one Y-branch component 24 connected thereto.

The exit ends (indicated at 25 in FIG. 8) of those branch components 24 which are not connected to a subsequent component may be closed by a 25 similar to the caps 10 in the mannequin of FIGS. 1 and 2, and again optionally the branch components 24 may comprise additional apertures in the side(s) of one or more branch components which are also closed by a cap—in FIGS. 4 to 8 a cap closing an aperture in a side of a branch component is shown at 27.

Figure 9:
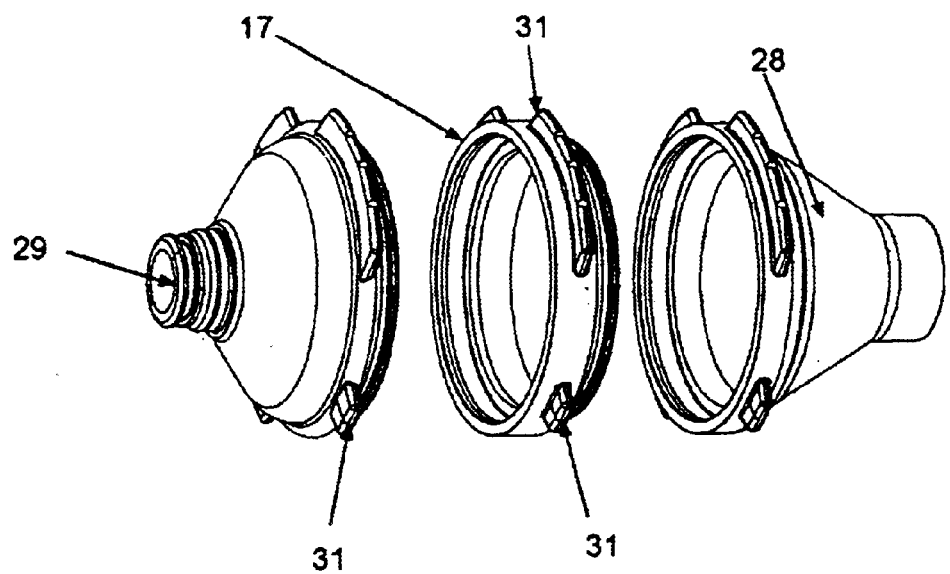
FIG. 9 is an exploded view of another component of the branch network of the mannequin of FIGS. 4 to 8.

Component 17 shown in FIGS. 4 to 7 and shown in exploded view in FIG. 9 has a hollow interior 28 and represents an internal organ within the body such as the stomach or a lung. The entry passage to the internal organ component 17 expands into the internal cavity 28 and the component has an exit passage 29. The component 17 may be connected to the exit end of a Y-branch component 24, and at its exit end 29 may be closed by a cap 25 or may connect to a further component of the branch network.

In the preferred form the internal organ component 17 is made up of entry end part 17a, exit end part 17b, and one or more intermediate annular components 30 which clip together to form the whole item 17. The component 30 may include a rubber or synthetic diaphragm (not shown) with a central aperture which extends across the interior of the component 17, requiring in use that a user manipulate the fibrescope to move the end of the fibrescope through the aperture in the diaphragm. The aperture in the diaphragm may be off centre so that the orientation of the diaphragm may be changed by rotating the centre component 30. Gripping portions 31 on the exterior of the centre component 30 and optionally also the parts 17a and 17b of the component 17 may include markings which enable the rotational position of the components relative to one another to be determined from the exterior without breaking down the component. Two or three centre components 30 may be fitted between the entry part 17a and exit part 17b optionally each with a diaphragm with apertures which are off centre so that by rotating each of the two or three components 30 relative to one another, the mannequin may be set up with the diaphragm apertures misaligned to increase the level of difficulty for a user manipulating the fibrescope.

As referred to previously a symbol object or image may be positioned on the inside end face of the caps 25. Preferably the caps are asymmetrical shaped so that it is possible to determine from the exterior the orientation of an asymmetrical image on the internal end face of the cap, when setting up the mannequin before use. Any of the interior surfaces of the mannequin components may carry graphics simulating the interior of a body passage or organ to make manipulation of a fibrescope in a patient as realistic as possible.

The apparatus may include means for introducing a flora air and a liquid into the interior of the apparatus to create bubbles (or a light foam) within the interior of parts of the apparatus, to further simulate or make more realistic use of the apparatus. One or more of the caps 10 or 25 (in the form of FIGS. 1 to 3, and FIGS. 4 to 9 respectively) or side caps 27 in the form of FIGS. 4 to 9, may include a small bore through the cap to one end of which on the exterior of the apparatus is attached a tube. Air under low pressure and a liquid which will create bubbles such as a detergent or similar for example, may be blown through the tube and into the interior of the apparatus. Such tubes may be connected to the apparatus at other caps or at other points. In addition the apparatus may optionally include means to introduce a lubricating liquid onto some of the interior surfaces of the apparatus. Referring to FIG. 6, a tube connected to the oral and nasal cavity component 15 may introduce a lubricating liquid, such as optionally again a detergent or similar, into the trough area 33 below the tongue web 23. One or more small bores may be provided through the tongue web 33 so that the lubricating liquid will in use slowly drip on to and coat the upwardly facing surface of the web 34 between the nasal passage 19 and oral cavity 21. From there the lubricating liquid may drip from the upper surface of the web 34 off the edge of the web 34 onto the back of the nasal passage 19. Alternative arrangements are possible and for example one or more small nozzles could be arranged to spray a lubricating liquid into the interior of the oral and nasal cavities or passages intermittently.

The foregoing describes the invention including the preferred form thereof. Alterations and modifications as will be obvious to those skilled in the art are intended to be incorporated within the scope hereof as defined by the accompanying claims.

What is claimed is:

1. A fibrescope training apparatus comprising a mouth aperture, a nose aperture, or mouth and nose apertures, leading to a network of multiple pathways through which a fibrescope may be manipulated, the pathways formed by connection together of a number of individual branch components, at least some of which individual branch components are of a general Y-configuration comprising an entry end and at least one exit end, which may be connected together sequentially to form an expanding number of pathways in two or three dimensions, and further including a component representing an internal organ, connectable to a branch component and comprising an entry passage that expands into an internal cavity and an exit passage, the internal cavity of the organ component reducing to said exit passage from the internal cavity.

2. A fibrescope training apparatus according to claim 1 wherein the internal organ component comprises one or more annular intermediate parts around the internal cavity which can be added or removed to change the size of the cavity within the internal organ component.

3. A fibrescope training apparatus according to claim 2 wherein one or more of said annular part(s) supports a diaphragm extending across the cavity within the internal organ component, with an aperture through the diaphragm through which a user may manipulate a fibrescope.

4. A fibrescope training apparatus according to claim 3 wherein the aperture through the diaphragm is off-centre relative to a longitudinal axis through the internal cavity.

5. A fibrescope training apparatus according to claim 1 further comprising one or more cap components connectable to an exit end of a branch component.

6. A fibrescope training apparatus according to claim 5 wherein one or more of said cap(s) comprises a symbol, object, or image on the underside of the cap which faces into the branch component when the cap is connected to the exit end of the branch component.

7. A fibrescope training apparatus according to claim 6 wherein said symbol, object, or image is asymmetrical.

8. A fibrescope training apparatus according to claim 1 wherein one or more of the branch components comprises an aperture through a side of the component into the interior of the component between the entry end and the exit end, and further comprising one or more caps including a part adapted to fit in said aperture and an end comprising a symbol, object, or image which will face into the interior of the branch component when the cap is in place.

9. A fibrescope training apparatus according to claim 1 comprising a mouth aperture and including a protruding web inside the mouth aperture which simulates a patient's tongue.

10. A fibrescope training apparatus according to claim 1 including means for introducing a flow of air and a liquid to create bubbles or a foam within the interior of the apparatus.

11. A fibrescope training apparatus according to claim 1 comprising an oral and nasal cavity component including said mouth and nose apertures, wherein said mouth and nose apertures lead to oral and nasal cavities and said oral and nasal cavities lead to and join at an exit from the oral and nasal cavity component, and including a protruding web inside the oral cavity which simulates a patient's tongue.

12. A fibrescope training apparatus according to claim 11 including means to introduce a lubricating liquid to interior surfaces of the oral and nasal component.

13. A fibrescope training apparatus according to one of claims 1, and 2 to 11 of the preceding claims including means to introduce a lubricating liquid to interior surfaces of the apparatus.

14. A fibrescope training apparatus according to any one of claims 1, 2 to 11, and 12 further comprising a body enclosure in which the fibrescope training apparatus is housed.

15. A fibrescope training apparatus comprising an oral and nasal cavity part including a mouth aperture and a nose aperture which lead to oral and nasal cavities, which oral and nasal cavities join and lead to at least one internal organ part representing an internal organ and comprising an entry passage that expands into a larger internal cavity, said internal organ part comprising one or more annular intermediate parts around the internal cavity which can be added or removed to change the size of the cavity within the internal organ part.

16. A fibrescope training apparatus comprising an oral and nasal cavity component including mouth and nose apertures, an oral cavity including within it a protruding web which simulates a patient's tongue, said mouth and nose apertures leading to oral and nasal cavities and said oral and nasal cavities leading to and joining at an exit end from the oral and nasal cavity component, said exit end leading to a network of multiple pathways through which a fibrescope may be manipulated, the pathways formed by connection together of a number of individual branch components.

17. A fibrescope training apparatus comprising an oral and nasal cavity component including mouth and nose apertures that lead to respective oral and nasal cavities, and a protruding web inside the oral cavity which simulates a patient's tongue, said oral and nasal cavities joining and leading to a network of multiple pathways through which a fibrescope may be manipulated, the pathways formed by connection together of a number of individual branch components, one or more cap components connectable to an exit end of at least one said branch component, one or more of said cap component(s) comprising a symbol, object, or image on the underside of the cap which faces into the branch component when the cap is connected to the exit end of the branch component.

18. A fibrescope training apparatus according to claim 17 wherein at least some of said individual branch components are of a general Y-configuration comprising an entry end and at least one exit end, which may be connected together sequentially to form an expanding number of pathways in two or three dimensions.

19. A fibrescope training apparatus according to claim 18 further including a component representing an internal organ, connectable to a branch component and comprising an entry passage that expands into an internal cavity.

20. A fibrescope training apparatus according to claim 17 wherein said symbol, object, or image is asymmetrical.

21. A fibrescope training apparatus according to claim 17 wherein said oral and nasal cavities lead to and join at an exit end from the oral and nasal cavity component.

22. A fibrescope training apparatus according to claim 17 further comprising a body enclosure in which the fibrescope training apparatus is housed.

* * * * *